United States Patent [19]

Andre

[11] Patent Number: 4,508,326

[45] Date of Patent: Apr. 2, 1985

[54] PRESSURE CHUCK FOR IRREGULAR ARTICLES

[76] Inventor: Eugene R. Andre, 26405 Hendrie, Huntington Woods, Mich. 48070

[21] Appl. No.: 457,154

[22] Filed: Jan. 11, 1983

[51] Int. Cl.³ .................. B23K 19/00; B25B 1/24
[52] U.S. Cl. ........................ 269/22; 269/254 CS; 269/152; 269/266; 269/287; 269/329
[58] Field of Search ............... 269/266, 22, 254 CS, 269/287, 152, 43, 329

[56] References Cited

U.S. PATENT DOCUMENTS

| | | | |
|---|---|---|---|
| 2,379,220 | 6/1945 | Englehart | 269/22 |
| 2,882,771 | 4/1959 | Blazek | 269/266 |
| 3,140,087 | 7/1964 | Heath et al. | 269/22 |
| 3,237,252 | 3/1966 | Ratcliffe | 269/22 |
| 3,358,335 | 12/1967 | Ralphs et al. | 269/22 |
| 3,608,809 | 9/1971 | Cushman | 269/22 |
| 3,990,692 | 11/1976 | Wolverton | 269/266 |
| 4,047,709 | 9/1977 | Thyberg et al. | 269/22 |
| 4,200,272 | 4/1980 | Godding | 269/266 |

*Primary Examiner*—Robert C. Watson
*Attorney, Agent, or Firm*—Barnes, Kisselle, Raisch, Choate Whittemore & Hulbert

[57] ABSTRACT

A pressure clamping structure for irregular workpieces includes initial locator points for positioning a part, multiple, opposed and spaced pressure discs operated by fluid pressure to engage the part and secure it in the located position, and spring backed support jacks engaging the part which are pressure locked in position to insure a rigid locking of the part for purposes of metal removal by machining or grinding. In addition, flexible pressure walls extending over areas of the workpiece are pressurized to further stabilize the workpiece and prevent vibration during the work operation.

7 Claims, 6 Drawing Figures

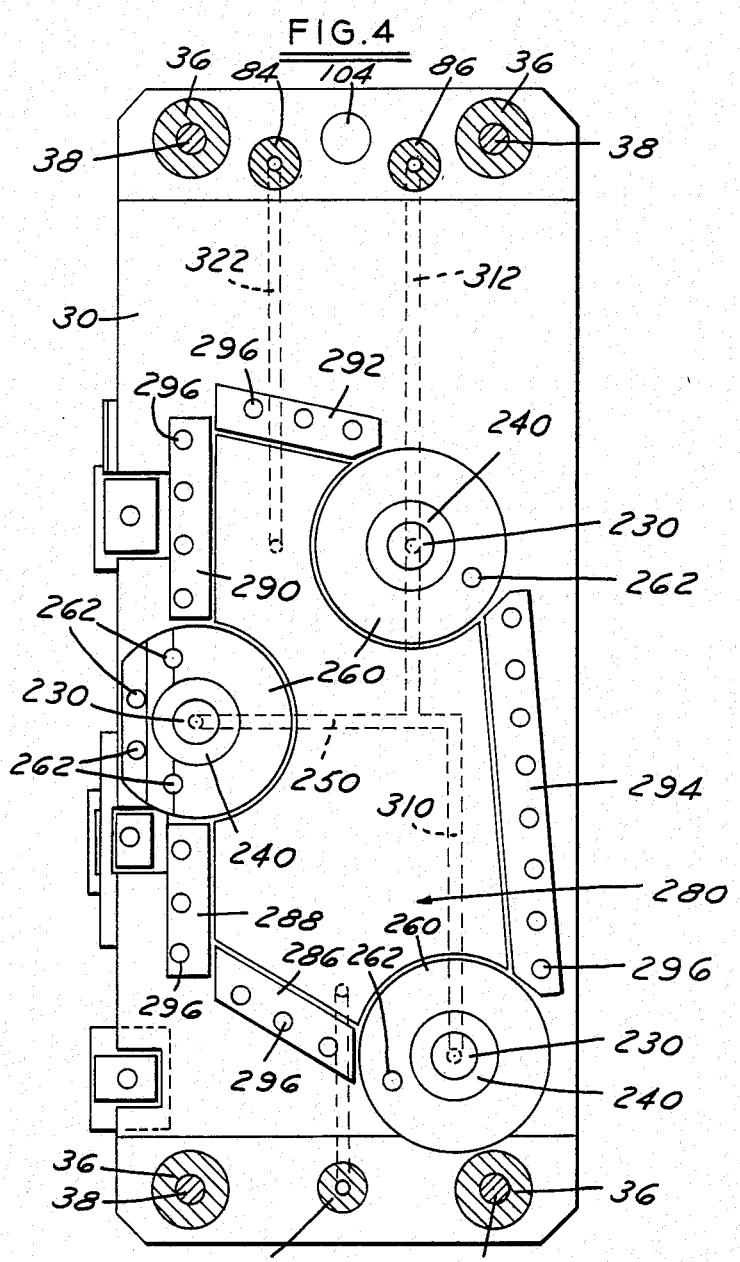
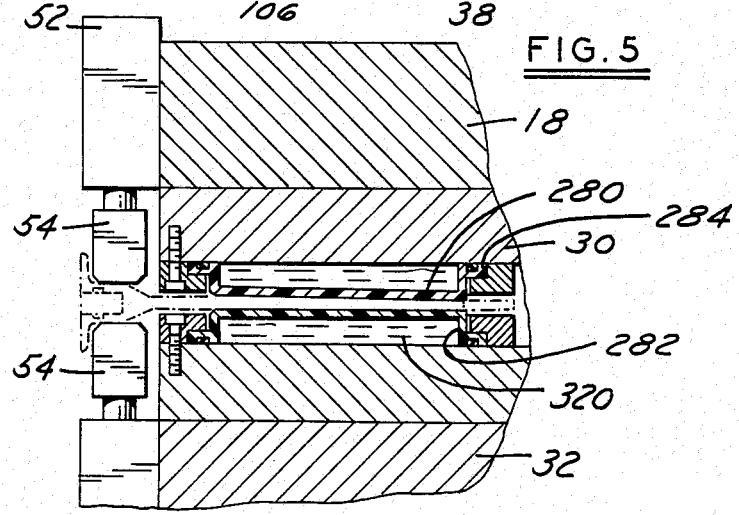

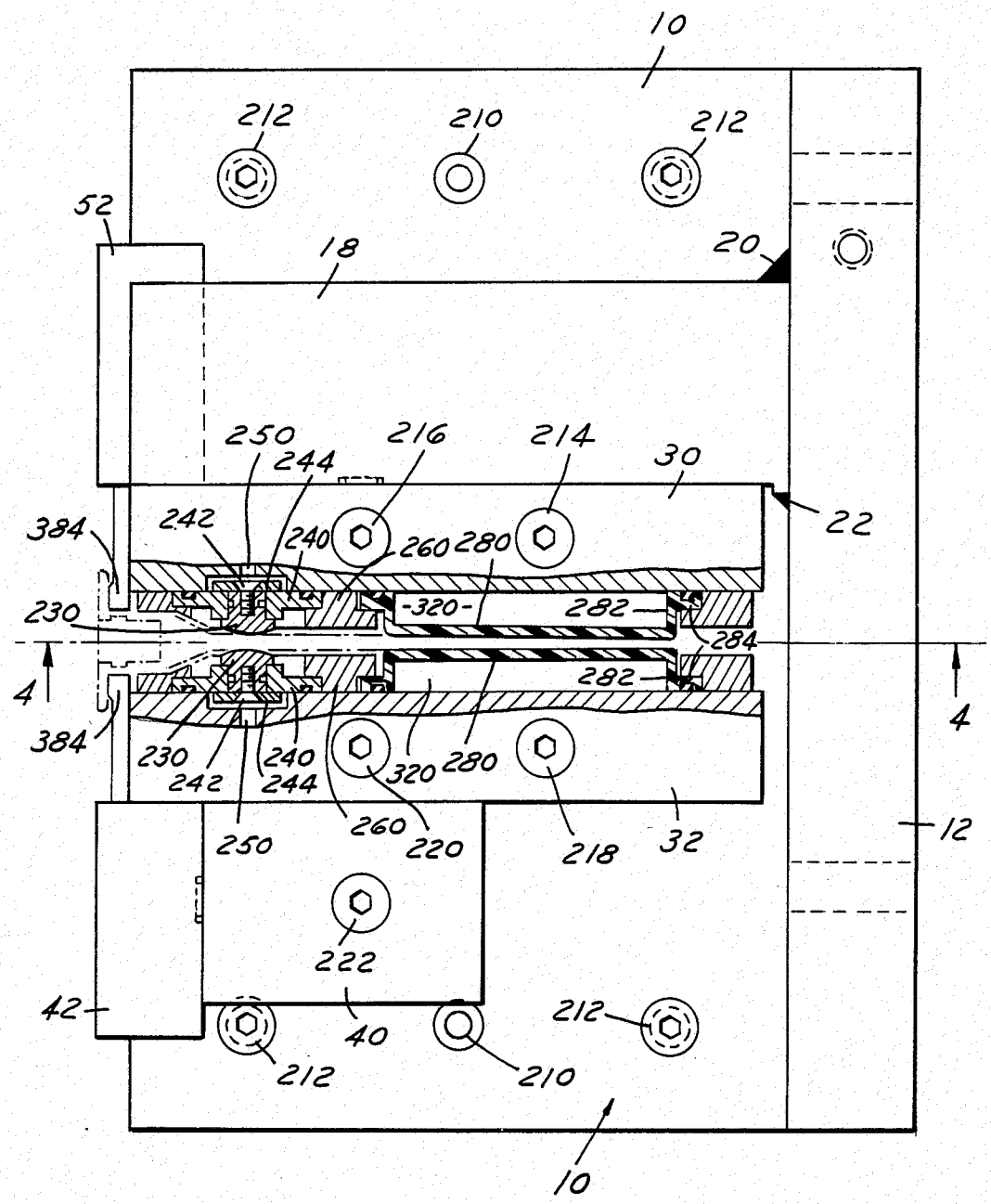

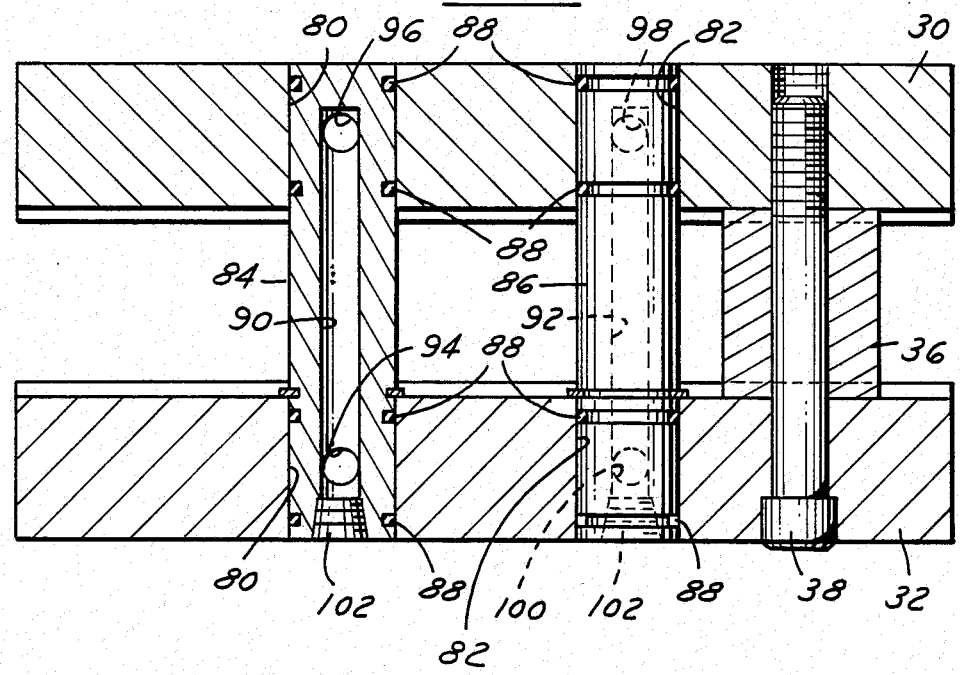

PRESSURE CHUCK FOR IRREGULAR ARTICLES

FIELD OF INVENTION

This invention relates to the holding of parts for machining or grinding operations and more particularly to holding parts with a pressure wall which will not distort the part during a machining operation.

BACKGROUND OF INVENTION

Hydrostatic holding devices have now been used for a number of years to hold work parts for machining operations. These devices generally utilize a flexible wall that can be expanded by hydraulic pressure to make proper contact with a wall of a part. An early U.S. patent in this field, issued May 8, 1956, to George L. Atherholt, Sr. et al, No. 2,744,756, disclosed the expansion of a thin wall steel cylinder by hydrostatic pressure to grip a work part. A further more recent advance in this art came with the issuance of U.S. Pat. No. 4,116,453 (Sept. 26, 1978) to Eugene R. Andre. This patent teaches that a thin-wall cylindrical part, which might be subject to distortion by outside wall pressure, can be tightly gripped with a pliant sleeve which is urged against the part by pressure on the pliant sleeve on the side opposite the work part.

The present invention has an object to provide a hydrostatic holding device which is not limited to circular or cylindrical parts but which may function to hold irregularly shaped parts or flat parts in a manner to permit machining without vibration or distortion.

A further object of the invention is the provision of a holding device which is readily adaptable to different shapes and sizes of parts.

Other objects and features of the invention will be apparent in the following specification and claims in which the invention is described with details directed to persons skilled in the art on the manner and process of using the invention all in connection with the best mode contemplated for the practice of the invention.

BRIEF DESCRIPTION OF THE DRAWINGS

Drawings accompany the disclosure and the various views thereof may be briefly described as:

FIG. 3, an end view partially in section on line 3—3 of FIG. 2 showing details of the holding device.

FIG. 4, a sectional view taken on line 4—4 of FIG. 3.

FIG. 5, a sectional view taken on line 5—5 of FIG. 2.

FIG. 6, a sectional view taken on line 6—6 of FIG. 2.

DETAILED DESCRIPTION OF THE INVENTION AND THE MANNER AND PROCESS OF USING IT

Figure 2:
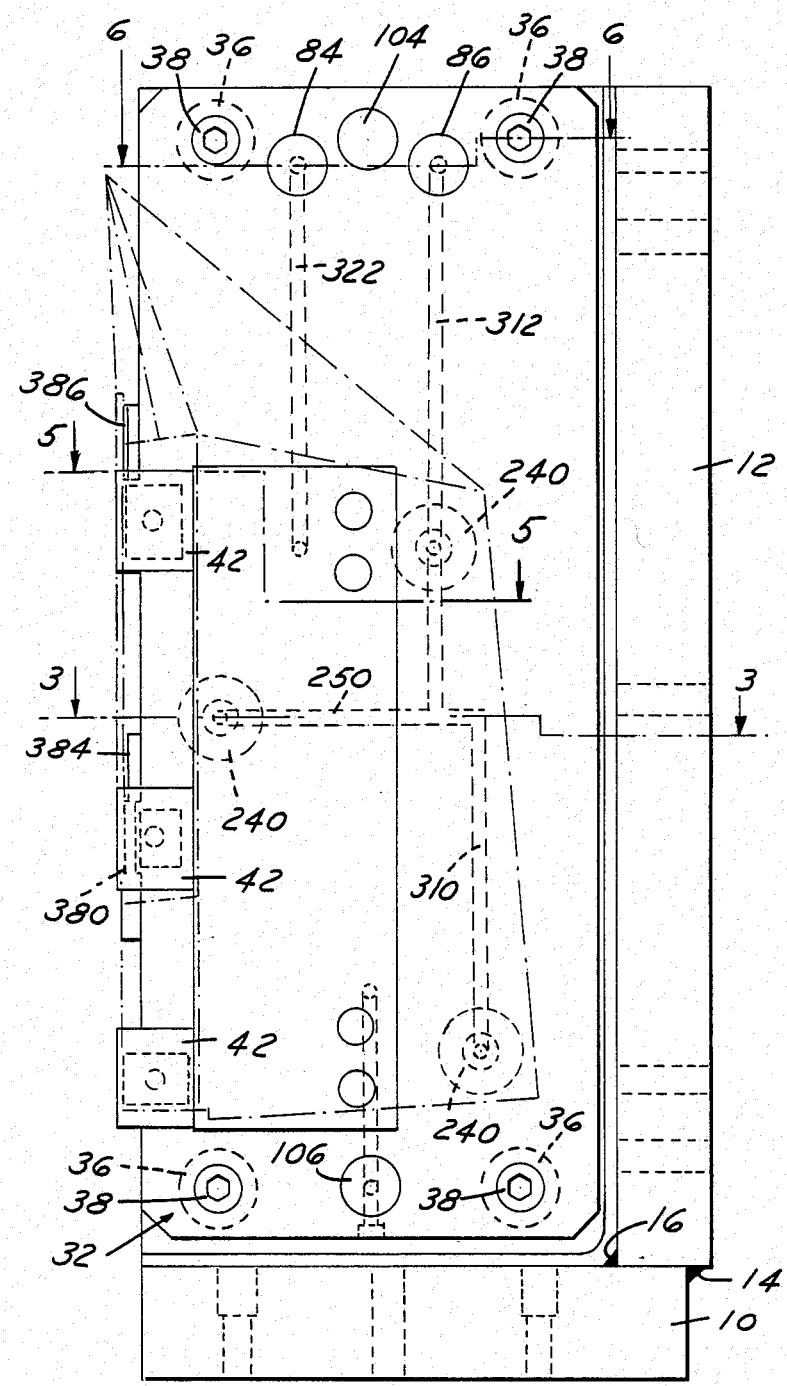
FIG. 2, a side view of the assembly.

Before proceeding with the description of the apparatus, it may be helpful to identify the part to be secured. This part is illustrated as a flat pointed element, the edge of which is shown in dot-dash lines at the center of the drawing. In FIG. 2, the side profile of the part is shown in dot-dash lines. In FIG. 3, a section of the part is illustrated in dot-dash lines.

Figure 1:
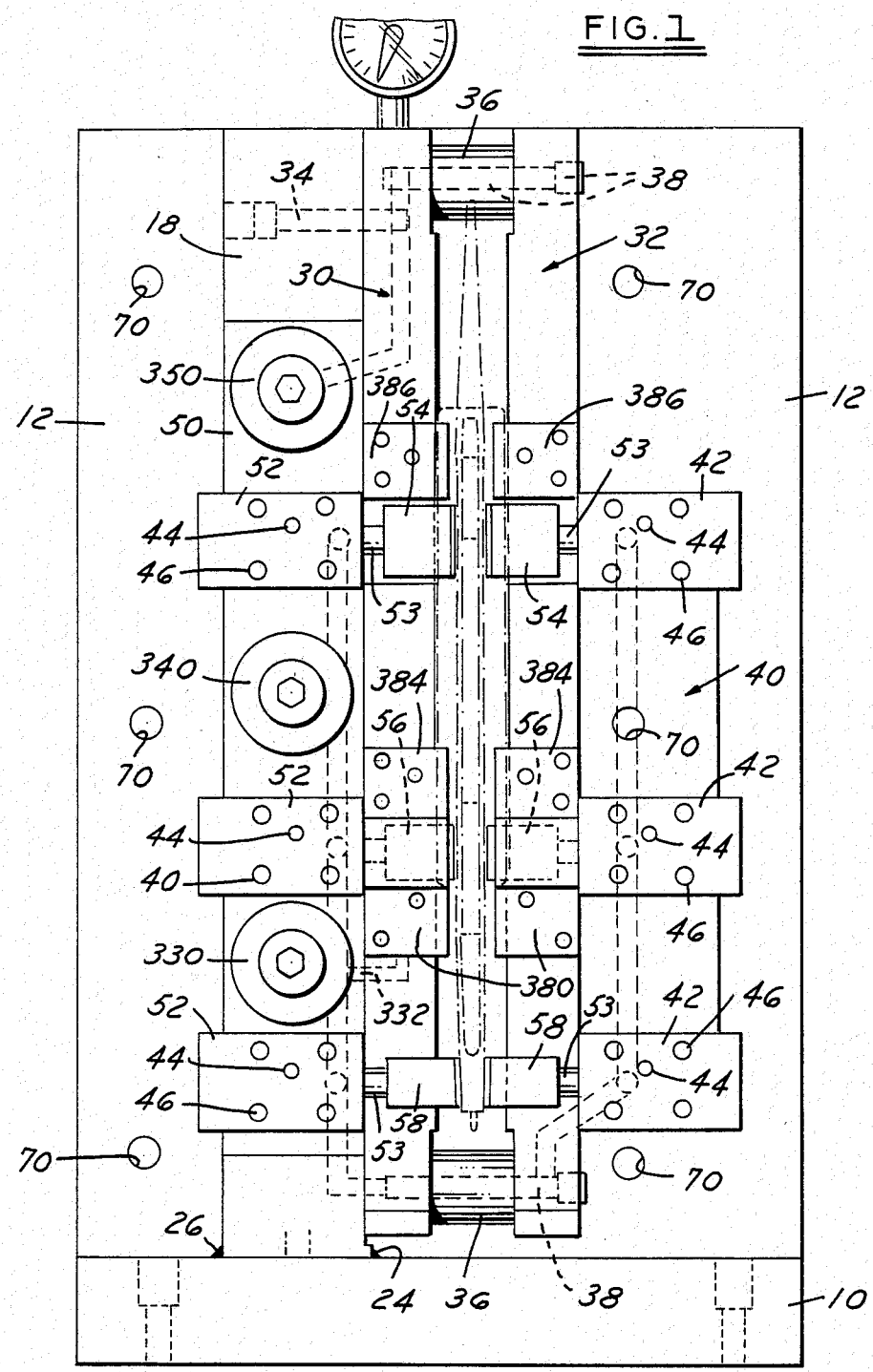
FIG. 1, a front elevation of the part clamping assembly.

With reference to the drawings, in FIG. 1, a base plate 10 supports a back plate 12 which is welded to the base at 14 and 16 (FIG. 2). An upright heavy weldment plate 18 is welded to the back plate 16 at 20 and 22 and to the base plate at 24 and 26. Thus, a very rigid and heavy weldment structure is provided. Looking at the front view (FIG. 1), we see the front edges of two pressure fixture plates 30 and 32. Fixture plate 30 is bolted securely to plate 18 by a plurality of socket head screws, one of which is shown at 34. Spacers 36, four in number, are interposed between plates 30 and 32 which are securely fastened together by socket head screws 38. On the right hand side of fixture plate 32 is secured a jack plate mount 40 on which are mounted three small support jack plates 42. Locating dowels 44 and socket head screws 46 securely fasten the support jack plates to the plate 40.

A similar jack plate mount 50 is provided on the left side of the assembly at the front edge of the plate 18 with three support jack plates 52 mounted opposite the plates 42 on the right side. Each pair of jack plates contains a shank 53 backed by a light spring (not shown) in a cylinder within the plate with the projecting shanks 53 carrying a nose piece shaped to contact a work part in a proper contoured contact. In the upper pair 42-52 the shanks 53 carry nose pieces 54, the intermediate pair carry nose pieces 56, and the lower pair carry nose pieces 58. In FIG. 3, the intermediate nose pices 56 are illustrated. In FIG. 5, the upper nose pieces 54 are illustrated.

The shanks 53 in the jack plates are surrounded by a gripping sleeve which can be hydraulically actuated to lock the shanks in the position against a workpiece in which they are initially located by the light backing springs.

Holes 70 in back plate 12 are provided to secure the entire fixture in a suitable machine where metal removal is to be accomplished.

In FIG. 6, hydraulic connector rods are illustrated in a sectional view taken on line 6—6 of FIG. 2. These connector rods provide hydraulic pressure connections between plates 30 and 32. Opposed holes 80 and 82 receive connector rods 84 and 86, respectively, which fit snugly in the holes. O-rings 88 seal the ends of the rods in ther respective holes. Each rod has a central bore 90 and 92, respectively, which connects at opposite ends to ports 94, 96, 98, 100, respectively. Each rod has a closing plug 102 at one end and a cone point screw at the other end. The function of these passages and ports will be later referenced. Locating dowels 104 and 106 are provided as shown in FIG. 2 at the top and bottom to locate the parts relative to each other and the upright weldment 18. The bottom dowel 106 is also a connector rod similar to rods 84 and 86 with a central passage and end plugs to carry actuating pressure from one side of the system to the other as will be explained.

FIG. 3 is a top view partially in section which shows the top of the base plate 10 and the top edge of the back plate 12. At the sides of the base plate are locator bushings 210 and other holes 212 to receive socket head screws to hold down the assembly on a suitable machine base. A threaded seal plug 214 in the top of plate 30 is used as a bleed opening for the pressure system to be described. A similar plug 216 is used as a bleed plug. In plate 32, a screw plug 218 is used as a pipe plug in a pressure system. Similarly, plug 220 covers and closes a fill opening for a pressure system. A plug 222 in the top of jack plate support 40 serves to close a fill opening for a pressure system.

The fixture plates 30 and 32 each carry, on their contiguous faces, a plurality of pressure actuated flexing walls which will move simultaneously into contact with a work part. Pressure discs are the first of devices to be described. With reference to FIGS. 3 and 4, in FIG. 4, three metal discs 230 are shown spaced apart on the inner face of fixture plate 30. If reference is now made to FIG. 3, it will be seen that discs 230 have a crowned head portion with a cylindrical shank mounted in a central recess of a flanged ring 240. A flat head screw 242 is countersunk into a washer 244 which bears against the face of the ring 240. The shank of the disc 230 can carry a sealing O-ring in a suitable groove and the outer flange of ring 240 has an O-ring seal which seals it against the inner surface of the plate 30. FIG. 3, of course, shows the same assembly in registry on the contiguous face of fixture plate 32. Each plate 30 and 32 is provided with a shallow recess around the washers 244, this recess being hydraulically associated with a pressure passage 250 in the respective fixture plates. The flanged rings 240 are each held in sealing contact with the inner faces of the respective plates by hold-down rings 260 which are tightly secured to the faces of the plates by suitably recessed socket head screws 262 distributed around the rings 260.

The flanged rings 240 are formed of a dense plastic such as Teflon, nylon, polyurethane, or a special material carrying the trademark Hydra-Fibre TM. This material will flex to a sufficient degree, that when fluid pressure is increased in the chambers behind washers 244, the crowned discs or buttons 230 will move toward each other.

Supplementing the holding discs 230 is a second system in the form of an irregular sheet 280 of Hydra-Fibre (Trademark) spanning an area between and around the holding rings 260. The sheet of material has in cross-section a double flange at the edges in the form of a side flange 282 and an outwardly extending hold-down flange 284. This is shown in the sectional views of FIGS. 3 and 5. In the area of the hold-down rings 260 the sheet and edge flange is concavely curved so that it is held down in this area by rings 260. Between the rings 260 in the straight sections are hold-down rails 286, 288, 290, 292 and 294 each suitably secured to the plates 30 and 32 by recessed socket head screws 296. The edge flanges 284 are provided with a surface groove to carry an O-ring type sealing strip.

In FIGS. 2 and 4, pressure passages are shown in dotted lines and formed in the respective plates 30 and 32. The passage 250 joins a passage 310, each of which is connected to passage 312 associated with the uppermost ring 240 and connecting to the connector rod 86 (FIGS. 4 and 6) and ports 98 and 102 in this rod.

The chamber 320 formed between the sheets 280 and the respective plates 30 and 32 on which they are mounted is connected by a passage 322 leading to connector rod 84 (FIGS. 4 and 6) and ports 94 and 96 in this rod.

In FIG. 1, in the jack plate mount bar 50, there are installed three pressure actuators 330, 340 and 350, each of which includes a screw in plug with a hexagonal socket which will drive a piston into a pressure transmitting material such as a high grade grease. These actuators are marked as System #1, System #2, and System #3. One example of a screw actuated piston is shown in U.S. Pat. No. 3,335,569, issued Aug. 15, 1967. Remote controlled pistons can also be used as shown in U.S. Pat. No. 3,677,559, issued July 18, 1972. See also the previously referenced U.S. Pat. No. 4,116,453. Direct pressure systems can also be utilized.

Pressure System #1 (330) actuates the locking of the locating disc pads 230, three on each side of the work part in opposed pairs. A passage 332 carries pressure to fixture plates 30 and 32. A passage in plate 30 leads to connector rod 86 (FIG. 6) where ports 98 and 100 connect to passages 312, 310 and 250 to reach the actuating chambers of the disc pads 230 in each plate 30 and 32.

Pressure System #2 (340) actuates a locking system for the jack shanks 53. As previously explained, these jack shanks are backed by a light spring which urges them toward the work part. When the work part is in place with the opposed pairs of nose pieces 54, 56 and 58 positioned against the part, the System #2 screw plug is actuated to create pressure on the system through suitable passages to a gripping sleeve around each shank which locks it in the position to which the backing spring has carried against the work part. If desired, the jacks may be held in a back-off position until the pressure System #1 is actuated. When released, the jacks will move to contact the part by action of the light springs and they may again be clamped securely in the forward position in contact with the part. The back-off position of the jacks can be maintained either mechancially or hydraulically.

Pressure System #3 (350) actuates the pressure backing for the pads 280 on either side of the work part. Pressure reaches the connector rod 84 (FIG. 6) where it passes through ports 94 and 96 as well as bore 90 to reach passages 322 leading to the chambers inside the pad sheets 280.

For the particular part illustrated, mechanical locators are also provided for the initial location of the part. In FIG. 1, two plates 380 are secured by socket head screws to the face of plates 30 and 32. The upper facing corners of those plates engage the lower part of a flange on the work part. Additional opposed locator plates 384 and 386 are similarly secured to the fixture plates 30 and 32 to be contacted by an extending flange on the part. Thus, the plates 380 provide the initial X—X location and the plates 384, 386 provide the initial Y—Y location of the part.

Once the work part is inserted between the fixture plates 30 and 32 and its initial location established by the plates 380, 384 and 386, system #1 is then actuated and the crowned discs 230 are hydraulically forced against the parts at predetermined datum points specified by the part designer. This establishes the theoretical centerline of the part.

System #2 is now actuated with the jack nose pieces 54, 56 and 58 in contact with the workpiece. The hydraulic system acts on the shafts 53 to lock the jacks in place. The springs backing the jacks are light enough that they will simply move the jacks into contact with the part but will not override the pressure discs 230.

System #3 is now actuated and this puts pressure into the chambers within the pads 280 to contact as much of the part as possible to increase rigidity and dampen any tendency toward vibration. The part is now rigidly held and ready for machining.

It will be appreciated that the system referenced as hydraulic is preferably filled with a suitable grease or fluid with an acceptable viscosity so that pressure exerted by the pistion screws will be transmitted through the system. Fill openings and bleed openings are provided to insure the filling of the system. While air pressure might be used, it is generally not as acceptable for rigidly holding a part. Reference to hydraulic systems shall be taken to mean any pressure fluid system acceptable for certain applications.

What is claimed is:

1. A workpiece holder for securing a workpiece in a predetermined location to prevent movement or vibration during a metal removing operation which comprises:
   (a) means forming a recess to receive the workpiece,
   (b) initial fixed locator members to orient the workpiece in the said recess, and
   (c) a plurality of spaced pressure discs adjacent said recess operable to contact and secure the workpiece in said recess upon pressure actuation of said discs,
   (d) said means forming said workpiece recess comprising a base, spaced parallel plates mounted on said base, rod means securing said plates in spaced relation, hydraulic pressure developing means in one of said plates, and means forming pressure passages in said plates and said rods to conduct fluid pressure to said spaced pressure discs.

2. A workpiece holder as defined in claim 1 which includes resiliently biased work contact jacks on said spaced parallel plates movable to contact a workpiece mounted in opposed positions, and pressure responsive means to lock said jacks in a position against said workpiece.

3. A workpiece holder as defined in claim 1 in which flexible wall portions are mounted on at least one of said plates comprising flexible sheets having flanges secured in sealing relation to a plate to form pressure recesses, and said pressure passages in said plates are in communication with said pressure recesses formed by said sheets.

4. A workpiece holder for securing a flat workpiece in a predetermined location to prevent movement or vibration during a metal removing operation which comprises:
   (a) frame means forming a relatively flat recess to receive the workpiece,
   (b) initial locator members on said frame to orient the workpiece in the said recess,
   (c) flexible relatively flat wall portions mounted in said workpiece holder on each side of said recess and generally planar with said recess, means to clamp the edges of said wall portions against said frame means of said workpiece holder, and
   (d) means in said frame on each said workpiece recess forming a pressure recess behind said flexible wall portions to admit fluid under pressure to move said wall portions against a workpiece.

5. A workpiece holder for securing a workpiece in a predetermined location to prevent movement or vibration during a metal removing operation which comprises:
   (a) means forming a recess to receive the workpiece,
   (b) initial fixed locator members to orient the workpiece in the said recess, and
   (c) a plurality of spaced pressure discs adjacent said recess operable to contact and secure the workpiece in said recess upon pressure actuation of said discs,
   (d) means disposed in said recess between and around said spaced pressure discs comprising flexible wall portions movable toward a workpiece in said recess, and means forming a pressure recess behind said flexible wall portions to admit fluid under pressure to move said wall portions against a workpiece.

6. A workpiece holder for a thin and relatively flat irregular workpiece for a machining operation to prevent movement or vibration during a metal removing operation which comprises:
   (a) frame means forming a flat recess to receive the flat workpiece,
   (b) initial fixed locator members on said frame to orient the workpiece generally in the plane of the workpiece in said recess,
   (c) a plurality of pairs of opposed spaced pressure discs in said frame operable by fluid pressure to contact the opposite sides of said workpiece in said recess in a direction normal to the plane of the workpiece,
   (d) resiliently biased pairs of work contact jacks in said frame spaced around said recess movable by said bias in a direction normal to the plane of said workpiece against said workpiece,
   (e) pressure responsive means to lock said jacks against movement relative to said workpiece during a machining operation, and
   (f) means disposed on each side of said recess in said frame generally parallel to the workpiece in said recess and around said pressure discs comprising flexible wall portions to be moved against the flat surface of opposite sides of the workpiece, and means forming a pressure recess behind each flexible wall portions to admit fluid under pressure against said wall portions to move said wall portions against a workpiece.

7. A method of securing a thin and relatively flat workpiece for a machining operation to prevent movement or vibration during a metal removing operation which comprises:
   (a) providing a frame with a recess to receive the workpiece,
   (b) establishing multiple locator members on said frame to orient the workpiece in the recess,
   (c) providing a plurality of opposed pressure operated discs adjacent said recess to contact said workpiece in a direction normal to the plane of said workpiece,
   (d) providing a plurality of pressure lockable contact jacks to contact said workpiece and resiliently biased toward said workpiece in a direction normal to the plane of said workpiece,
   (e) providing pressure flexed walls on each side of said workpiece to overlie a substantial portion of the area of said workpiece,
   (f) locating a workpiece in the frame on said multiple locators and between said contact jacks,
   (g) actuating the pressure operating discs to clamp the workpiece,
   (h) stabilizing the position of said jacks to lock them against the workpiece, and
   (i) introducing pressure behind said flexed walls to press them against the workpiece.

* * * * *